(12) United States Patent
Howell

(10) Patent No.: US 10,787,209 B1
(45) Date of Patent: Sep. 29, 2020

(54) ANTIJACKKNIFE HITCH SYSTEM FOR A TRAILER

(71) Applicant: Richard D. Meyer, Birmingham, AL (US)

(72) Inventor: Jeffrey E. Howell, Clanton, AL (US)

( * ) Notice: Subject to any disclaimer, the term of this patent is extended or adjusted under 35 U.S.C. 154(b) by 241 days.

(21) Appl. No.: 16/128,717

(22) Filed: Sep. 12, 2018

(51) Int. Cl.
*B62D 53/08* (2006.01)
*B62D 13/06* (2006.01)
*B60D 1/30* (2006.01)
*B60D 1/24* (2006.01)

(52) U.S. Cl.
CPC ......... *B62D 53/0871* (2013.01); *B60D 1/245* (2013.01); *B60D 1/30* (2013.01); *B62D 13/06* (2013.01)

(58) Field of Classification Search
CPC ...... B62D 53/0871; B60D 1/245; B60D 1/30; B60D 1/55
See application file for complete search history.

(56) References Cited

U.S. PATENT DOCUMENTS

| | | | | |
|---|---|---|---|---|
| 3,033,593 A | * | 5/1962 | Zaha | B60D 1/173 280/460.1 |
| 6,712,380 B1 | * | 3/2004 | Edens | B60D 1/065 280/474 |
| 7,527,279 B1 | * | 5/2009 | McCalip | B60D 1/00 280/460.1 |
| 8,511,702 B1 | | 8/2013 | Howell | |
| 2008/0246253 A1 | * | 10/2008 | Timmons | B62D 13/06 280/442 |

* cited by examiner

*Primary Examiner* — Kevin Hurley
*Assistant Examiner* — Michael R Stabley
(74) *Attorney, Agent, or Firm* — Lanier Ford Shaver & Payne, PC; Gerald M. Walsh

(57) ABSTRACT

An antijackknife system for a trailer having a trailer hitch with a ball joint and alignment arms, a housing on the underside of the trailer at a front end of the trailer, and a front end of the housing having a ball joint socket. A slide plate is in an interior of the housing and an actuator is on the underside of the trailer. The actuator is operatively coupled to a rear end of the slide plate. Casters are attached to an axle assembly at a rear end of the trailer. The casters each have a locking plate attached thereto with the locking plate having a locking slot. Locking pins are positioned on the axle assembly. The slide plate is placed in a first position by the actuator wherein the ball joint socket rotates freely on the ball joint and the locking pins are placed in the locking slots. Alternatively, the slide plate is placed in a second position by the actuator wherein the ball joint socket does not rotate on the ball joint and the locking pins are pulled out of the locking slots.

19 Claims, 6 Drawing Sheets

ANTIJACKKNIFE HITCH SYSTEM FOR A TRAILER

FIELD OF THE INVENTION

The present invention relates to trailers with caster wheels and trailer hitch systems to prevent jackknifing when backing up a trailer, and more particularly to an antijackknife system which automatically prevents jackknifing when the tow vehicle is put into reverse gear.

BACKGROUND OF THE INVENTION

It is well known that backing up a vehicle with a trailer is difficult and frustrating. Much of the difficulty associated with backing up a trailer results from the fact that it is not intuitive for drivers to sense the jackknifing situation before it is too late and from the fact that many drivers do not know how to steer properly to align the trailer to avoid a jackknifing situation. In general, vehicle-trailer backing up is by nature an unstable motion. Jackknifing occurs when a vehicle-trailer is approaching away from its equilibrium position, a position intended by the driver through his or her steering input, and thus becomes unstable. The relative angle between vehicle and trailer diverges from the driver's intended target angle, and usually increases if proper steering and/or braking action are not taken. This is typically out of control by the driver, either due to lack of sufficient driving skill, or the condition is too severe.

U.S. Pat. No. 5,558,351 describes an antijackknife assembly for a vehicle-trailer, but it is operable only when the trailer is being towed in the forward direction. The trailer hitch has an arcuate extension which extends away from the ball joint. The tongue of the trailer hitch has a ball socket which engages the ball joint and also has a solenoid device which engages the tip of the arcuate extension when energized and limits the degree to which the ball socket can pivot on the ball joint.

The use of caster type wheels on trailers are known to be useful to prevent jackknifing during backing-up the trailer. U.S. Pat. No. 2,475,174 discloses a trailer having a pair of caster-type wheels, with the trailer having a single central hitch for attachment to the towing vehicle. The trailer also has a pair of separate auxiliary connectors disposed on opposite sides of the hitch adjacent the ends of the vehicle bumper. The auxiliary connectors control a flexible cable linkage, which in turn controls the swiveling of the casters. A three-point hitch arrangement is disclosed, and does not permit free swiveling of the casters, but rather provides a complex arrangement for controlling swiveling of the casters. U.S. Pat. No. 3,033,593 discloses a trailer having a pair of caster-type wheels, a central hitch of conventional configuration, and a pair of sidewardly spaced tie bars so as to create a three-point connection. This arrangement rigidifies the trailer relative to the vehicle, but the side tie bars must be released when swiveling of the wheels and backing of the trailer is desired. Further, this three-point connection does not permit proper rolling movement of the trailer relative to the vehicle, such as may be necessary to compensate for irregularities in the highway. U.S. Pat. No. 4,305,602 discloses a trailer having caster-type wheels, with the trailer having a dual hitch arrangement so as to rigidify the trailer relative to the vehicle. This double hitch arrangement, however, has several disadvantages. The tow vehicle must be provided with a specialized tow bar which mounts hitch balls thereon. Further, the overall hitch arrangement does not permit or compensate for rolling movement of the trailer relative to the vehicle due to unevenness in the highway. This hitch arrangement also does not permit even weight distribution on the trailer or vehicle wheels. U.S. Pat. No. 4,512,593 discloses two caster wheels joined together by drive sprockets and chains so that the caster wheels are constrained for simultaneous movement. The trailer also has two rigid tow bars which couple to sidewardly-spaced hitch balls mounted on the tow vehicle. This arrangement does not permit relative roll between the vehicle and trailer.

U.S. Pat. No. 8,511,702, incorporated herein by reference, discloses an antijackknife system having locking mechanisms which automatically lock caster type wheels at the rear of a trailer in a fixed position in the direction parallel to the longitudinal centerline of the trailer and to the line of direction of travel of the tow vehicle pulling the trailer forward. In this forward configuration the tongue of the trailer freely rotates on a trailer hitch insert. In a backup configuration a locking mechanism automatically locks the trailer tongue into linear alignment with the trailer hitch insert. The caster type wheels rotate freely about a vertical axis, and when the trailer is backed up by the tow vehicle the trailer will stay in linear alignment with the tow vehicle. The caster type wheels will automatically turn in a direction corresponding to the front wheels of the tow vehicle, thereby completely preventing jackknifing of the trailer. However, this system requires the use of two actuators, one to lock the trailer tongue and another to unlock the castor wheels. An improved system would require only one actuator to perform these locking and unlocking functions.

SUMMARY OF THE INVENTION

The present invention is an antijackknife system for a trailer having a trailer hitch with a ball joint and alignment arms, a housing attached to an underside of the trailer and near a front end of the trailer, and a front end of the housing having a ball joint socket. A slide plate is positioned in an interior of the housing and an actuator is attached to the underside of the trailer near a rear end of the housing. The actuator is operatively coupled to a rear end of the slide plate. One or more rotatable casters are attached to an axle assembly at a rear end of the trailer. The actuator may be a hydraulic jack. The casters each have a locking plate attached thereto with the locking plate having a locking slot. Locking pins are positioned on the axle assembly. The slide plate is placed in a first position by the actuator wherein the ball joint socket rotates freely on the ball joint and the locking pins are placed in the locking slots. Alternatively, the slide plate is placed in a second position by the actuator wherein the ball joint socket does not rotate on the ball joint and the locking pins are pulled out of the locking slots.

A cable extends from the rear end of the slide plate to rear ends of the locking pins, wherein the cable pulls the locking pins out of the locking slots when the slide plate is in the second position. An alignment block is attached to a front end of the slide plate and engages the alignment arms to prevent the ball joint socket from rotating on the ball joint when the slide plate is in the second position. Locking yoke assemblies on the axle assembly retain the locking pins bias the locking pins into the locking slots.

The alignment block may be positioned outside of and underneath the housing. The actuator pulls the slide plate into the first position when the vehicle is placed in drive and pushes the slide plate to engage the alignment arms when the vehicle is placed in reverse. When the locking pins are placed in the locking slots the casters will turn only in a direction parallel to a line of direction of travel. When the locking pins are pulled out of the locking slots the casters will turn in a direction corresponding to front wheels of the tow vehicle.

An advantage of the present invention is that jackknifing is completely prevented during the backing up of the trailer by a tow vehicle when the slide plate is placed in the second position, preferably by placing the transmission of the tow vehicle in reverse.

Another advantage is that the system automatically reversibly locks a trailer hitch of the trailer in alignment with a trailer hitch of the tow vehicle and automatically reversibly unlocks casters type wheels on the trailer for backing up the tow vehicle and trailer.

Another advantage is that the system automatically reversibly unlocks a trailer hitch of the trailer from a trailer hitch of the tow vehicle so the trailer ball joint socket pivots freely on the trailer hitch ball joint and, at the same time, the casters are reversibly locked into a direction parallel with the centerline of the trailer for the forward movement of the tow vehicle and trailer.

Another advantage is that when the trailer is backed up by the tow vehicle the trailer will stay in linear alignment with the tow vehicle, and the casters will automatically turn in a direction corresponding to the front wheels of the tow vehicle.

Another advantage is that only a single actuator is needed to lock and unlock the trailer hitch and the casters.

DETAILED DESCRIPTION OF THE INVENTION

While the following description details the preferred embodiments of the present invention, it is to be understood that the invention is not limited in its application to the details of construction and arrangement of the parts illustrated in the accompanying figures, since the invention is capable of other embodiments and of being practiced in various ways.

Figure 1A:
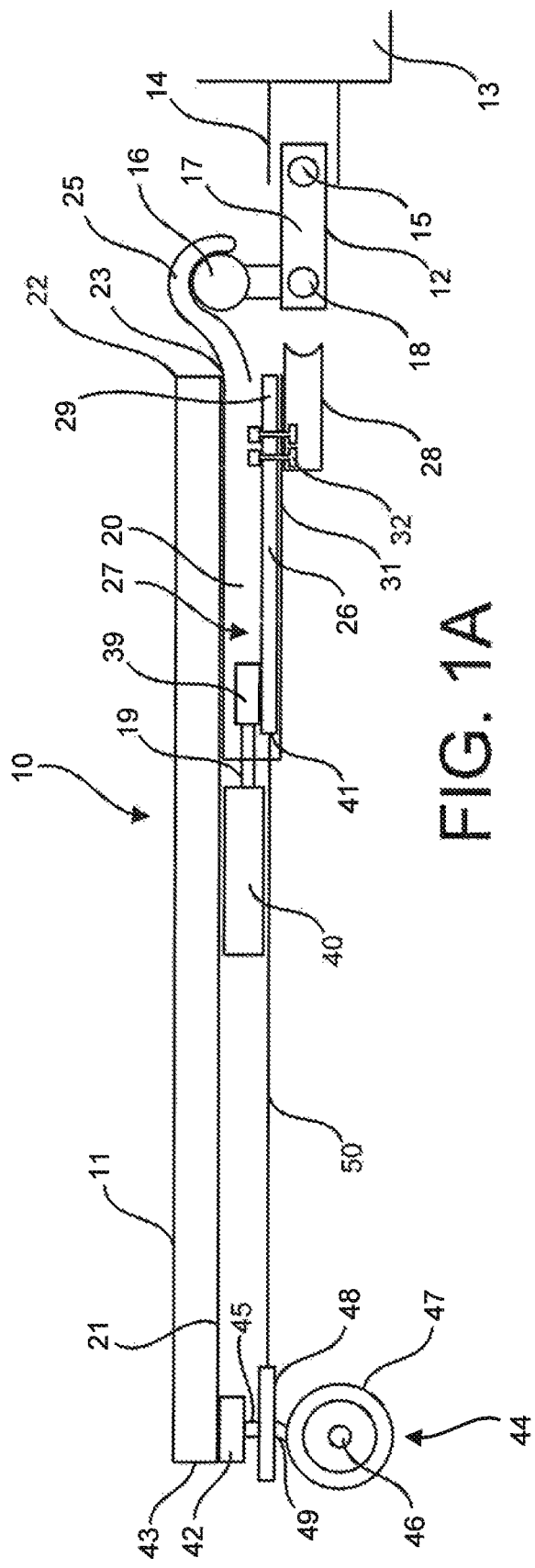
FIG. 1A is a side view illustration of the antijackknife system of the present invention in a locked position for towing a trailer in a forward direction.

FIG. 1A is a side view illustration of the antijackknife system 10 of the present invention in a locked position for towing a trailer 11 in a forward direction. The trailer 11 is shown hitched with a male hitch 12 to a vehicle 13 with a female hitch 14 using a locking pin 15, by methods well known in the art. The male hitch 12 has a ball joint 16 on shaft 17. Also, on the shaft 17 are alignment arms 18 that extend outwardly from the shaft 17. A tubular housing 20 is attached to the underside 21 of the trailer 11 near a front end 22 of the trailer 11. A front end 23 of the housing 20 has a tongue with a ball joint socket 25. The ball joint socket 25 is reversibly and rotatably attached to the ball joint 16 by methods well known in the art. A slide plate 26 is positioned in an interior 27 of the housing 20. The slide plate can move freely forward and backward in the housing 20. An alignment block 28 may be positioned under the housing 20 at the front end 23 of the housing 20 and attached to a front end 29 of the slide plate 26 through a slot 30 in the bottom 31 of the housing 20 (see FIG. 2A). The alignment block 28 may be fixed to the slide plate 26 with bolts 32 such that the alignment block 28 moves with the slide plate 26 and the bolts 32 move freely through the slot 30 in the bottom 31 of the housing 20.

An actuator 40, such as, for example, a hydraulic jack, is attached to the underside 21 of the trailer 11. The hydraulic jack 40 is connected to a rear end 41 of the slide plate 26, preferably to a guide member 39 attached at the rear end 41 by means of a piston rod 19. The slide plate 26 is in a first position at which the ball joint socket 25 can rotate freely on the ball joint 16. When the hydraulic jack 40 is energized it pushes the slide plate 26 forward to a second position towards the alignment arms on the male hitch 12. The slide plate is pushed until the front end 29 of the slide plate 26, or an alignment block 28 attached to the front end 29, engages the alignment arms (second position, see FIG. 1B). In this second position the ball joint socket 25 cannot rotate freely on the ball joint 16.

An axle assembly 42 is mounted on the underside 21 of the trailer 11 at the rear end 43 of the trailer 11. One or more casters 44 are mounted rotatably on the axle assembly 42 with caster axles 45. The casters 44 have wheel axles 46 and caster wheels 47. The casters 44 also have locking plates 48 to lock the casters 44 so they cannot rotate on their axles 46. The wheel axle 46 is suspended on a suspension arm 49 at an angle relative to the axle assembly 42. A cable 50 extends from the rear end 41 of the slide plate 26 to locking pins 51 inserted in locking slots 52 in the locking plates 48 (see FIG. 4A). When the hydraulic jack 40 is energized and pushes the slide plate 26 forward, the cable 50 pulls the locking pins 51 out of locking slots 52 and the casters 44 can rotate freely.

Figure 1B:
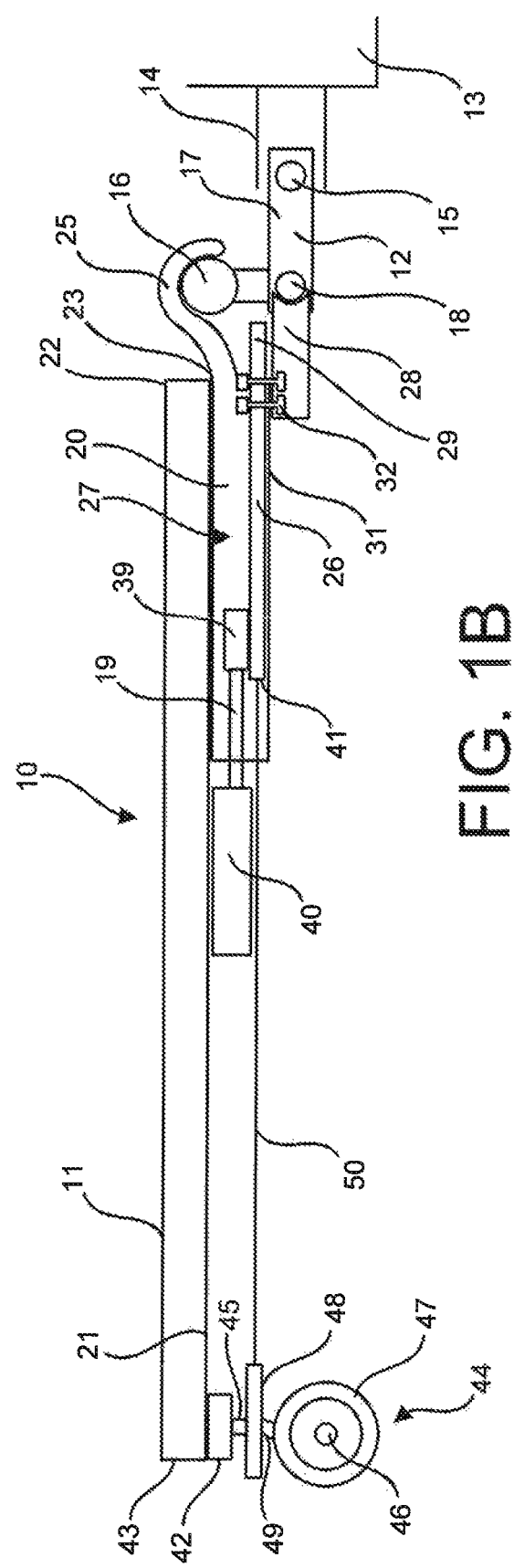
FIG. 1B is a side view illustration of the antijackknife system in an unlocked position for backing up the trailer.

FIG. 1B is a side view illustration of the antijackknife system 10 in an unlocked position for backing up the trailer 11. The hydraulic jack 40 is shown with the piston rod 19 extended further out of the hydraulic jack 40 and the slide plate 26 pushed forward to the second position. The alignment block 28 is shown engaging the alignment arms 18 and the ball joint socket 25 cannot rotate on the ball joint 16, thereby locking the hitch 12. The cable 50 is pulled forward as the slide plate 26 moves forward and the cable 50 pulls the locking pins 51 out of the locking slots 52. The unlocked casters 44 can rotate freely which allows the vehicle 13 to back up the trailer 11 and turn the vehicle 13 and trailer 11 without the locked hitch 12 jackknifing.

Figure 3:
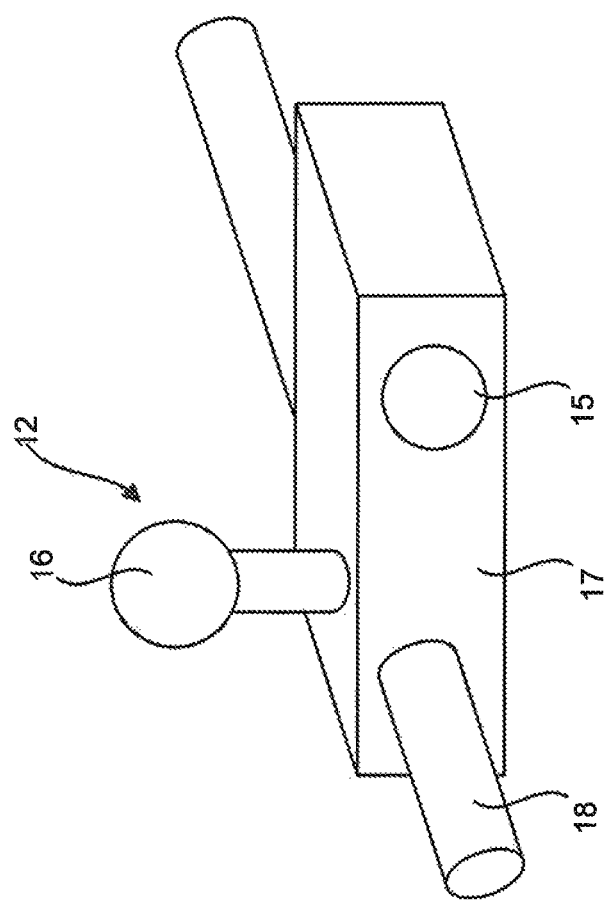
FIG. 3 shows a top perspective view of a trailer hitch having alignment arms extending from the sides of the trailer hitch.
Figure 2:
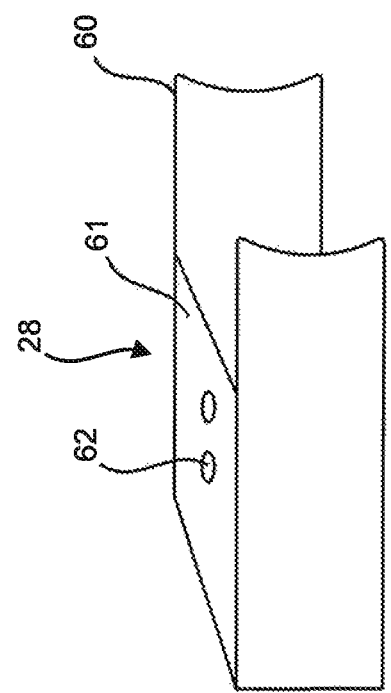
FIG. 2 shows a top perspective view of an alignment block for engaging alignment arms on a trailer hitch.

FIG. 2 shows an enlarged view of the alignment block 28. The front end 60 of the alignment block 28 is, preferably, curved concave to accommodate engagement with the alignment arms 18. The top 61 of the alignment block 28 has holes 62 for attachment with bolts 32 to the slide plate 26. FIG. 3 shows an enlarged view of the male hitch 12. The alignment arms 18 extend from the shaft 17 approximately perpendicular to the shaft 17.

Figure 4A:
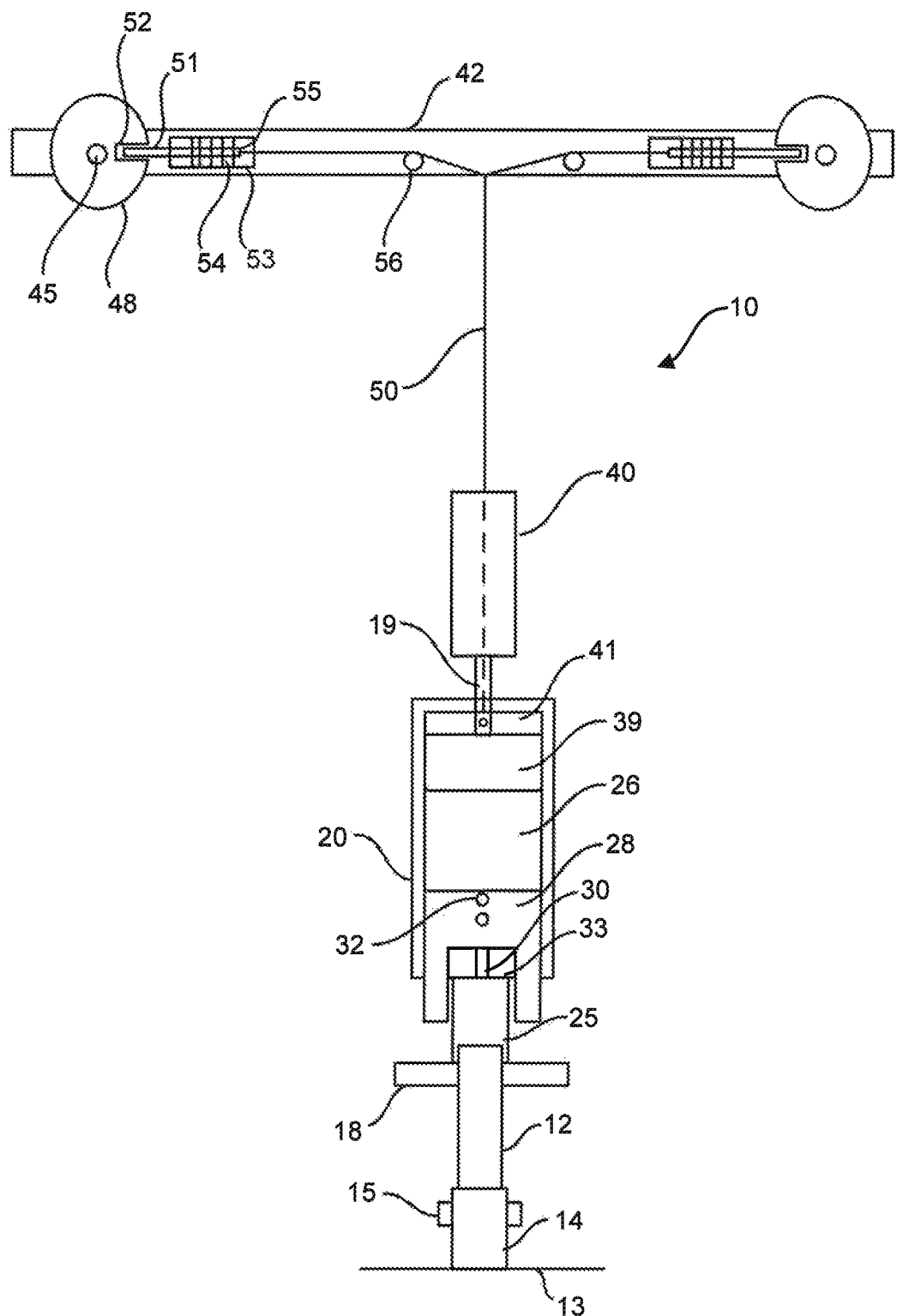
FIG. 4A is a bottom view illustration of the antijackknife system in a locked position for towing a trailer in a forward direction.

FIG. 4A illustrates a bottom view (underneath the trailer) of the antijackknife system 10 in position for towing the trailer 11 forward. The slide plate 26 is in the first position.

FIG. 4A further shows the locking slot 52 in the locking plate 48. The locking pin 51 is shown inserted in the locking slot 52. Lock yoke assemblies 53 are attached to the axle assembly 42. The locking pins 51 are retained in the lock yoke assemblies 53 which bias the locking pins 51 into the locking slots 52 with, for example, springs 54. In this configuration the casters 44 cannot rotate about their axles 45 and the caster wheels 47 remain parallel to the line of travel of the trailer 11. The cable 50 from the rear end 41 of the slide plate 26 attaches to the end 55 of the locking pin 51. The cable 50 is shown in a "Y" configuration but could constructed as a pair of cables, one for each locking pin. The cables 50 are guided to the locking pins 51 by pulleys or eyelets 56. The slot 30 in the bottom 31 of the housing 20 is also shown.

Figure 4B:
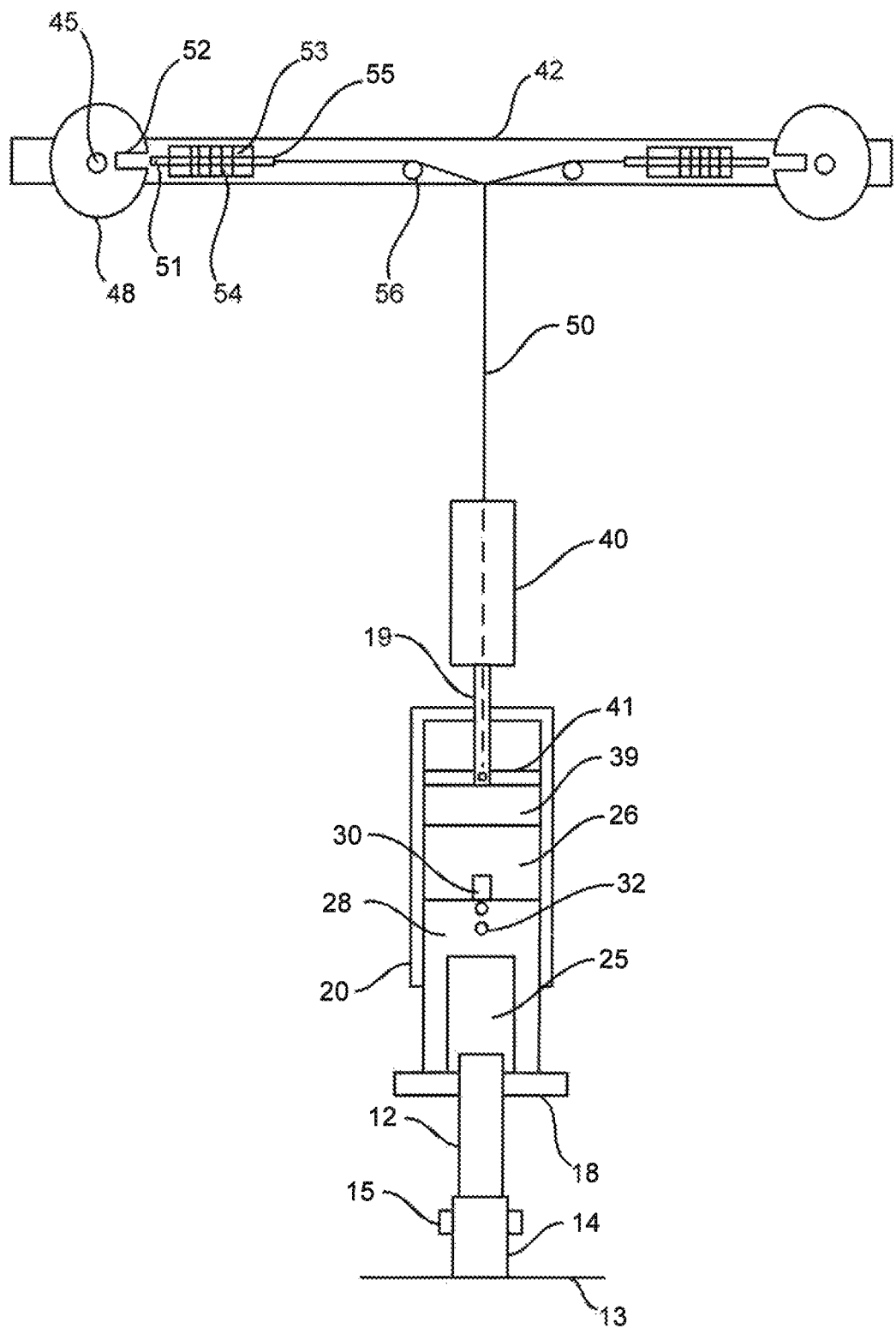
FIG. 4B is a bottom view illustration of the antijackknife system in an unlocked position for backing up the trailer.

FIG. 4B illustrates a bottom view of the antijackknife system 10 in position for backing up the trailer 11. The slide plate 26 is in the second position, pushed towards the trailer hitch 12, and the alignment block 28 has engaged the alignment arms 18 of the trailer hitch 12. In this configuration the trailer 11 is in line with the vehicle 13 and remains that way because the ball joint socket 25 cannot rotate on the ball joint 16. When the slide plate 26 is pushed towards the second position, the cable 50 pulls the locking pins 51 out of the locking slots 52 and the casters 44 are free to rotate. When the trailer 11 is backed up by the tow vehicle 13 the trailer 11 will stay in linear alignment with the tow vehicle 13. The casters 44 will automatically turn in a direction corresponding to the front wheels of the tow vehicle 13 and will align with the front wheels of the tow vehicle 13, thereby completely preventing jackknifing of the trailer 11. When the backup procedure is completed the hydraulic jack 40 can be energized again to lock the casters 44 and free the trailer hitch 12 when it is desired to pull the trailer forward.

Figure 5:
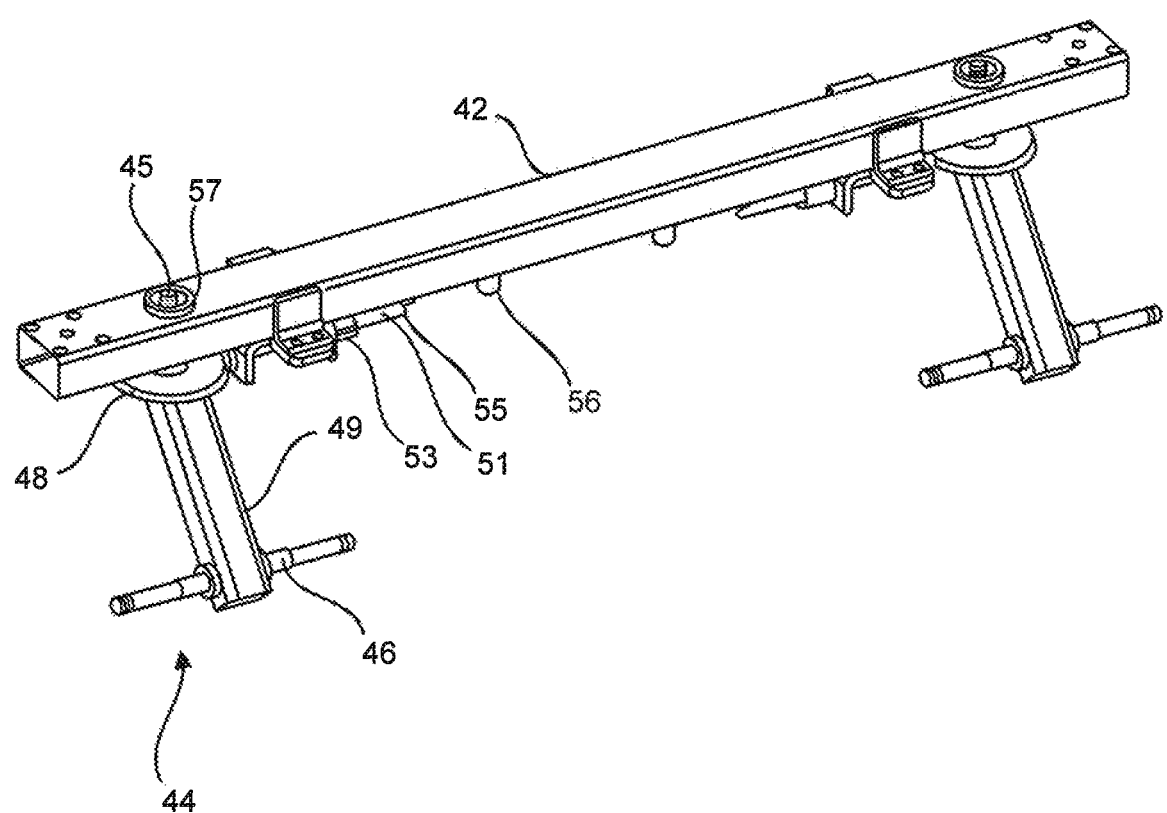
FIG. 5 is a top perspective view of the rear axle assembly of the present invention.
Figure 6:
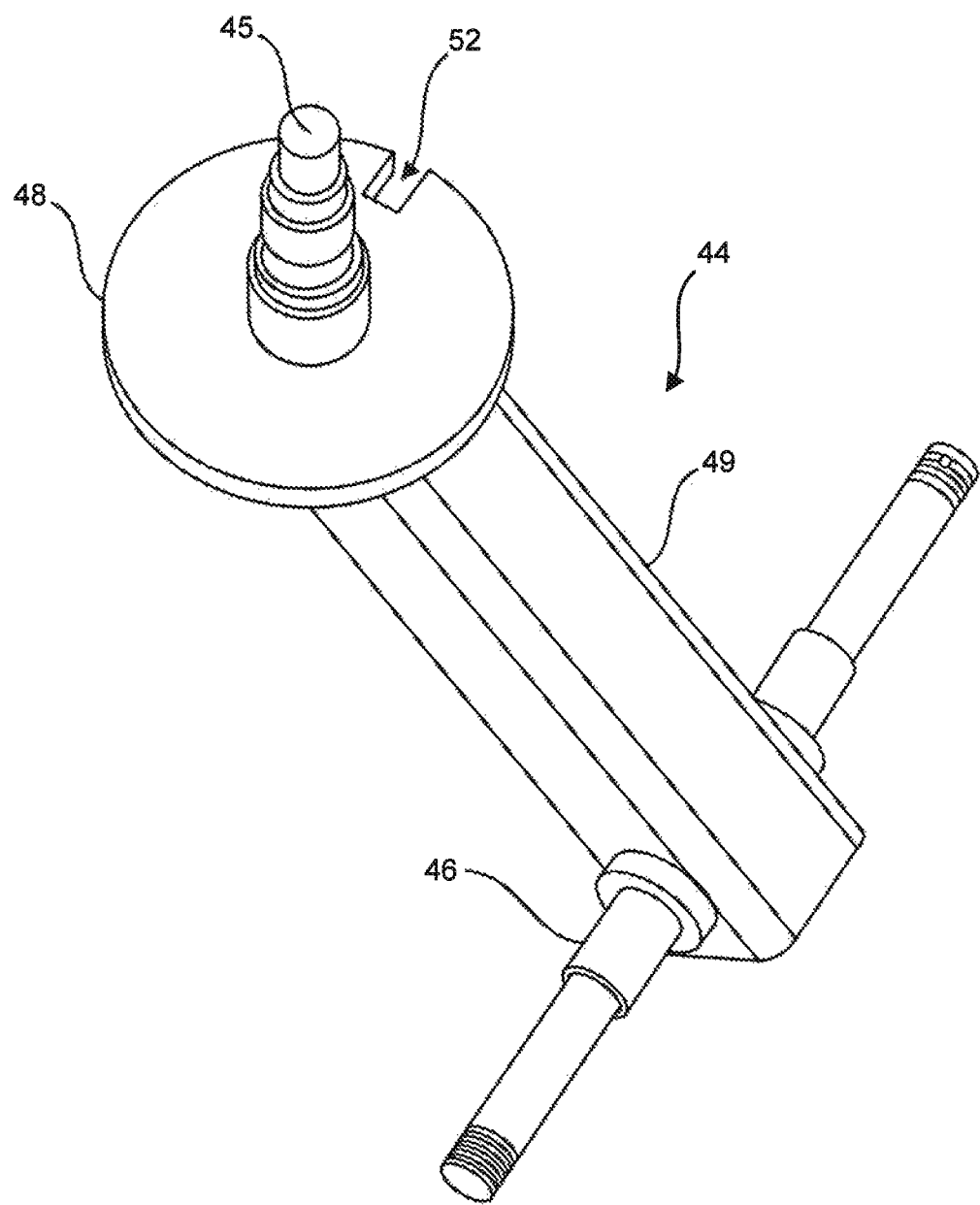
FIG. 6 is a top perspective view of a caster of the rear axle assembly.

FIG. 5 shows an enlarged view of the axle assembly 42. The caster axle 45 extends into a caster journal 57 on the axle assembly 42. FIG. 6 shows an enlarged view of the caster 44.

The foregoing description has been limited to specific embodiments of this invention. It will be apparent, however, that variations and modifications may be made by those skilled in the art to the disclosed embodiments of the invention, with the attainment of some or all of its advantages and without departing from the spirit and scope of the present invention. For example, although the casters are shown having an axle for two wheels casters with one wheel can be used. Any kind of actuator can be use besides a hydraulic jack, such as, for example, a solenoid or electric motor. Any suitable type of linkage can be used to connect the actuator to the locking pins. Any suitable type of lock yoke assembly can be used to bias the locking pins into the locking slots. The front end of the slide plate or the alignment block can have various configurations to engage the alignment arms. The actuator can be energized manually, automatically, or remotely. For example, the actuator will pull the slide plate into the first position when the vehicle is placed in drive and will push the slide plate to engage the alignment arms when the vehicle is placed in reverse. The slide plate may have additional guide members or no guide members.

It will be understood that various changes in the details, materials, and arrangements of the parts which have been described and illustrated above in order to explain the nature of this invention may be made by those skilled in the art without departing from the principle and scope of the invention as recited in the following claims.

I claim:
1. An antijackknife system for a trailer, comprising:
a) a trailer hitch having a ball joint and alignment arms;
b) a housing attached to an underside of the trailer and near a front end of the trailer, a front end of the housing having a ball joint socket;
c) a slide plate in an interior of the housing and an actuator attached to the underside of the trailer near a rear end of the housing and operatively coupled to a rear end of the slide plate;
d) one or more rotatable casters attached to an axle assembly at a rear end of the trailer, the casters each having a locking plate attached thereto and the locking plate having a locking slot;
e) locking pins positioned on the axle assembly; and
f) the slide plate being placed in a first position by the actuator wherein the ball joint socket rotates freely on the ball joint and the locking pins are placed in the locking slots or the slide plate being placed in a second position by the actuator wherein the ball joint socket does not rotate on the ball joint and the locking pins are pulled out of the locking slots.

2. The antijackknife system of claim 1, further comprising a cable extending from the rear end of the slide plate to rear ends of the locking pins, wherein the cable pulls the locking pins out of the locking slots when the slide plate is in the second position.

3. The antijackknife system of claim 1, further comprising an alignment block attached at to a front end of the slide plate and engaging the alignment arms to prevent the ball joint socket from rotating on the ball joint when the slide plate is in the second position.

4. The antijackknife system of claim 3, wherein the alignment block is positioned outside of and underneath the housing.

5. The antijackknife system of claim 1, further comprising locking yoke assemblies to retain the locking pins and to bias the locking pins into the locking slots.

6. The antijackknife system of claim 1, wherein the actuator is a hydraulic jack.

7. The antijackknife system of claim 1, wherein the actuator pulls the slide plate into the first position when the vehicle is placed in drive and pushes the slide plate to engage the alignment arms when the vehicle is placed in reverse.

8. The antijackknife system of claim 1, wherein when the locking pins are placed in the locking slots the casters will turn only in a direction parallel to a line of direction of travel.

9. The antijackknife system of claim 1, wherein when the locking pins are pulled out of the locking slots the casters will turn in a direction corresponding to front wheels of the tow vehicle.

10. An antijackknife system for a trailer, comprising:
a) a trailer hitch having a ball joint and alignment arms;
b) a housing attached to an underside of the trailer and near a front end of the trailer, a front end of the housing having a ball joint socket;
c) a slide plate in an interior of the housing and an actuator attached to the underside of the trailer near a rear end of the housing and operatively coupled to a rear end of the slide plate;
d) one or more rotatable casters attached to an axle assembly at a rear end of the trailer, the casters each having a locking plate attached thereto and the locking plate having a locking slot;
e) locking pins positioned on the axle assembly;

f) the slide plate being placed in a first position by the actuator wherein the ball joint socket rotates freely on the ball joint and the locking pins are placed in the locking slots or the slide plate being placed in a second position by the actuator wherein the ball joint socket does not rotate on the ball joint and the locking pins are pulled out of the locking slots;

g) a cable extending from the rear end of the slide plate to rear ends of the locking pins, wherein the cable pulls the locking pins out of the locking slots when the slide plate is in the second position;

h) alignment block attached at to a front end of the slide plate and engaging the alignment arms to prevent the ball joint socket from rotating on the ball joint when the slide plate is in the second position; and i) locking yoke assemblies to retain the locking pins and to bias the locking pins into the locking slots.

11. The antijackknife system of claim 10, wherein the alignment block is positioned outside of and underneath the housing.

12. The antijackknife system of claim 10, wherein the actuator is a hydraulic jack.

13. The antijackknife system of claim 10, wherein the actuator pulls the slide plate into the first position when the vehicle is placed in drive and pushes the slide plate to engage the alignment arms when the vehicle is placed in reverse.

14. The antijackknife system of claim 10, wherein when the locking pins are placed in the locking slots the casters will turn only in a direction parallel to a line of direction of travel.

15. The antijackknife system of claim 10, wherein when the locking pins are pulled out of the locking slots the casters will turn in a direction corresponding to front wheels of the tow vehicle.

16. An antijackknife system for a trailer, comprising:
a) a trailer hitch having a ball joint and alignment arms;
b) a housing attached to an underside of the trailer and near a front end of the trailer, a front end of the housing having a ball joint socket;
c) a slide plate in an interior of the housing and an actuator attached to the underside of the trailer near a rear end of the housing and operatively coupled to a rear end of the slide plate;
d) one or more rotatable casters attached to an axle assembly at a rear end of the trailer, the casters each having a locking plate attached thereto and the locking plate having a locking slot;
e) locking pins positioned on the axle assembly;
f) the slide plate being placed in a first position by the actuator wherein the ball joint socket rotates freely on the ball joint and the locking pins are placed in the locking slots or the slide plate being placed in a second position by the actuator wherein the ball joint socket does not rotate on the ball joint and the locking pins are pulled out of the locking slots;
g) a cable extending from the rear end of the slide plate to rear ends of the locking pins, wherein the cable pulls the locking pins out of the locking slots when the slide plate is in the second position;
h) alignment block attached at to a front end of the slide plate and engaging the alignment arms to prevent the ball joint socket from rotating on the ball joint when the slide plate is in the second position; and
i) locking yoke assemblies to retain the locking pins and to bias the locking pins into the locking slots,
wherein the alignment block is positioned outside of and underneath the housing and wherein the actuator pulls the slide plate into the first position when the vehicle is placed in drive and pushes the slide plate to engage the alignment arms when the vehicle is placed in reverse.

17. The antijackknife system of claim 16, wherein when the locking pins are placed in the locking slots the casters will turn only in a direction parallel to a line of direction of travel.

18. The antijackknife system of claim 17, wherein when the locking pins are pulled out of the locking slots the casters will turn in a direction corresponding to front wheels of the tow vehicle.

19. The antijackknife system of claim 18, wherein the actuator is a hydraulic jack.

\* \* \* \* \*